Nov. 29, 1966 D. M. BROWN 3,289,184

MAGNETIC CORE MEMORY READOUT

Filed Dec. 4, 1962 3 Sheets-Sheet 1

INVENTOR.
DOUGLAS M. BROWN
BY
[signature]
ATTORNEY

Nov. 29, 1966 D. M. BROWN 3,289,184

MAGNETIC CORE MEMORY READOUT

Filed Dec. 4, 1962 3 Sheets-Sheet 2

INVENTOR.
DOUGLAS M. BROWN
BY
S. C. Yeaton
ATTORNEY

Nov. 29, 1966 D. M. BROWN 3,289,184

MAGNETIC CORE MEMORY READOUT

Filed Dec. 4, 1962 3 Sheets-Sheet 3

INVENTOR.
DOUGLAS M. BROWN
BY
S.C. Yeaton
ATTORNEY

United States Patent Office 3,289,184

Patented Nov. 29, 1966

3,289,184
MAGNETIC CORE MEMORY READOUT

Douglas M. Brown, Bronx, N.Y., assignor to Sperry Rand Corporation, Great Neck, N.Y., a corporation of Delaware Filed Dec. 4, 1962, Ser. No. 242,206
11 Claims. (Cl. 340—174)

This invention relates to magnetic core memory circuits and in particular to noise cancellation means for such circuits.

Magnetic core memories are constructed in the form of a matrix of magnetic core elements arranged in an array of rows and columns. In most memories a sense wire threads through all of the cores in series so that the total output voltage induced in this wire contains components contributed by any core in which the flux happens to be changing during the time a reading is taken.

The state of a selected core in a matrix is determined by applying a first pulse to all of the cores in the column containing this core and by applying a second pulse to all of the cores in the row containing this core. Since both pulses are needed to interrogate a core, only the selected core can produce a signal output voltage. However, since a pulse is applied to an entire row or column of cores, any flux change induced by this pulse in the non-selected cores produces a noise voltage that can mask the desired signal voltage.

One prior art expedient for cancelling these noise voltages consists of threading the sense wire through successive cores in alternate directions so that the induced noise voltages will cancel. However, in this method, a signal output voltage that is produced when a selected core is interrogated may be of either polarity so that a bi-polar sense amplifier is required. Perfect noise cancellation is a practical impossibility with this arrangement.

Furthermore, in prior art magnetic core memories, erroneous readings may be obtained in that malfunctioning of the equipment can distort the output signal so as to provide a false indication of the true state of the stored data.

It is one object of the invention to provide a magnetic core memory with a high signal-to-noise ratio.

It is another object of the invention to provide a magnetic core memory that is operable over a wide temperature range.

It is still another object of the present invention to provide a magnetic core memory with a polarized output signal.

Yet another object of the present invention is to provide a magnetic core memory capable of indicating circuit malfunctions.

These and other objects are achieved in the present invention by purposely injecting an inverted signal into the output of the memory circuit.

The invention will be described with reference to the accompanying drawings in which.

The individual magnetic memory cores are conventionally constructed of ferrite material. Such ferrite materials can assume either of two stable flux states during normal operation.

Figure 1:
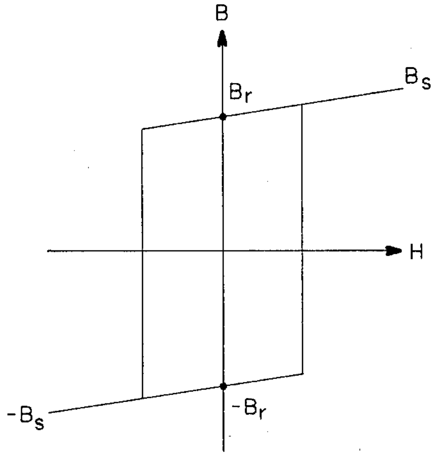
FIG. 1 is a graph useful in explaining the operation of the invention.

This phenomenon is illustrated in FIG. 1. When the material is subjected to a magnetizing force of sufficient intensity, it becomes saturated and carries a flux of density $B_s$. When the magnetizing force is removed, the material still carries a residual or remanent flux $B_r$. If now, the material is saturated in the reverse direction, it will support a flux having a density of $-B_s$. When this magnetizing force is removed, the material returns to a remanent condition represented by $-B_r$.

In order to determine the state of a particular memory core employing such a material, a current pulse is passed through a read wire linking with the core. This current pulse is in such a direction that it drives the core to the $-B_s$ state. Upon termination of the pulse, the core returns to the $-B_r$ state. A sense wire, also linking with the core, is acted upon by the changing flux so that an output voltage proportional to the time rate of change of flux is induced in his wire.

If the core previously existed in the $B_r$ state, an output voltage will be developed in the sense wire corresponding to the change in flux density from $B_r$ to $-B_s$. The resultant voltage is known as a "turnover voltage." It may be employed as a signal output voltage and used to actuate suitable utilization apparatus.

If the core previously existed in the $-B_r$ state, however, a voltage will also be generated in the sense wire, since the flux density will change momentarily from $-B_r$ to $-B_s$. This induced voltage constitutes a noise voltage. The magnitude of this noise voltage depends on the slope of the top and bottom boundaries of the hysteresis loop. Since this slope generally changes with temperature, the noise voltage also changes with temperature for most ferrite cores.

It will be noticed that the signal output voltage has the same polarity as the accompanying noise voltage. Thus, when a large number of cores are linked by a series sense wire and subjected to a read pulse, the total noise voltage can mask any signal output voltage generated at the particular core being interrogated.

Figure 2:
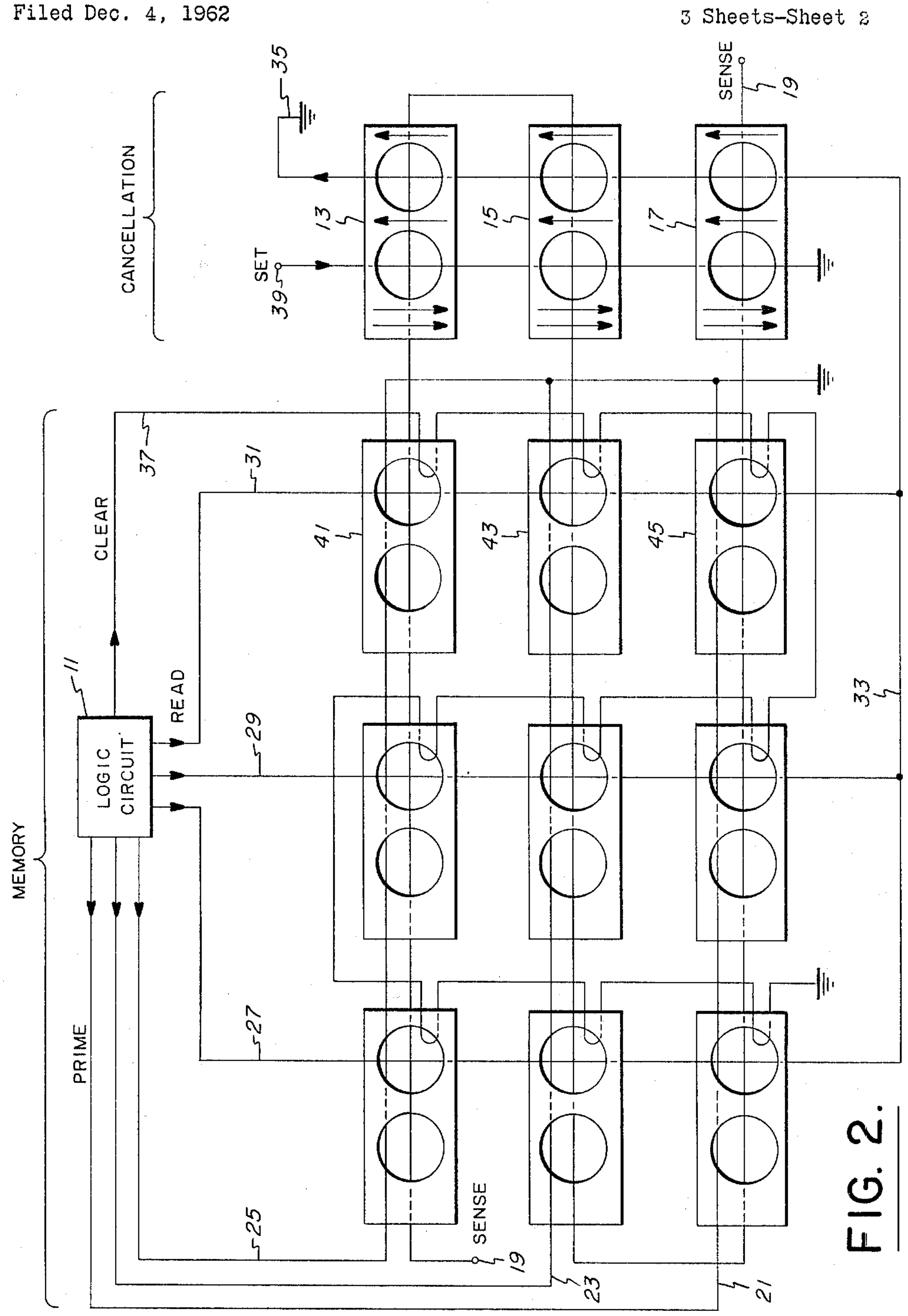
FIG. 2 is a schematic diagram illustrating a first embodiment of the invention.

FIG. 2 illustrates one embodiment of the invention. A memory unit comprised of an array of bi-aperture cores is excited by a conventional logic circuit 11. The memory may conveniently be of the type disclosed and claimed in the copending application of John J. King, Serial No. 186,916, filed April 12, 1962, now Patent Number 3,149,-314, entitled: "Core Memory Addressing," and assigned to the same assignee as the present application.

Figure 3:
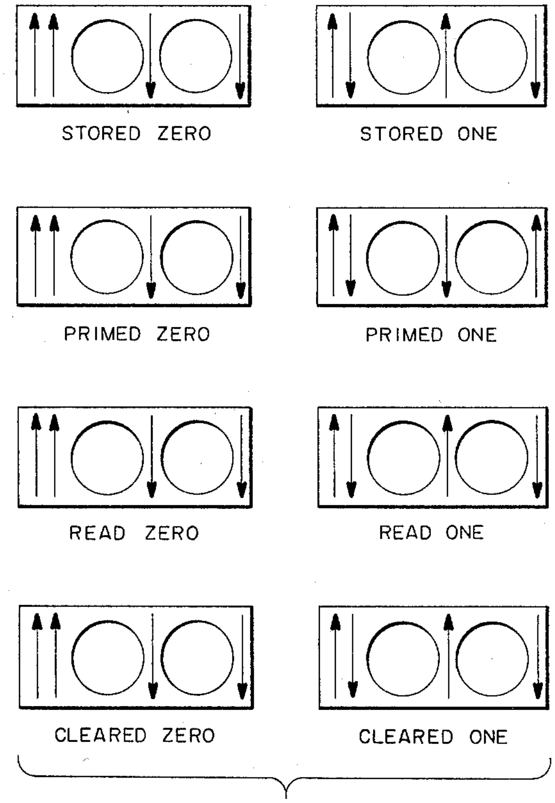
FIG. 3 is a schematic diagram illustrating the flux relationships in the memory cores used in the present invention.

Although many flux patterns may be used with bi-aperture cores, writing information into the memory cores of the particular circuit of FIG. 2 provides the stored zero or stored one flux patterns depicted in FIG. 3. This figure also illustrates various flux patterns occurring in the memory cores during the read cycle.

Referring again to FIG. 2, the logic circuit 11 may consist, for example, of conventional AND, OR, and NOT circuits that selectively excite the various prime leads and then excite the various read leads.

According to the principles of the present invention, a column of cancelling cores 13, 15 and 17 is provided to counteract the noise generated in the memory cores. These cores are made substantially identical to the cores used in the memory. The number of cores in the cancelling column is preferably made equal to the number of cores in a column of the memory unit. The sense wire 19 is extended to thread through each cancelling core in series. This is magnetically coupled to the center leg of each core and links with each cancelling core in the same relationship that it links with the memory cores in the corresponding row.

Individual prime wires pass through each row of cores in the memory unit and then connect with a common return. These wires link with the center leg of the associated cores. A pulse passing from a logic circuit through a prime wire establishes sufficient downwardly directed magnetizing force to saturate the center leg of each core in the group.

Individual read wires 27, 29 and 31, pass through each column of memory cores. The individual read wires are joined in a common bus 33 after passing through the memory cores. This bus then threads through the cancelling cores and is returned to a point 35.

A read wire is threaded through each column of memory cores so that a positive pulse from the logic circuit produces a downwardly directed magnetizing force to saturate the adjacent saturable outer leg of each core in the particular group.

The bus 33 is threaded through all of the cancelling cores so that a current flowing in the bus can produce an upwardly directed magnetizing force sufficient to saturate the adjacent saturable outer legs of each of these cores.

A clear wire 37 passes serially through all cores in the memory unit. This wire threads through the cores so that a positive pulse from the logic circuit saturates the associated saturable outer leg of each of these cores in a downward direction.

A set wire 39 is also passed through the cancelling cores. This wire is threaded through the cores so that an applied positive pulse saturates the center leg of each cancelling core in an upward direction. Thus the combination of the bus 33 and the set wire 39 forms means to establish the predetermined flux pattern in the cancelling cores indicated in FIG. 2.

It will be noticed that the various wires are threaded through the memory cores so as to produce flux in the downward direction in the associated saturable legs of these cores, whereas the wires are threaded through the cancelling cores so as to produce flux in the upward direction in the associated saturable legs of these cores.

For the purposes of explanation, assume that the core 41 contains a stored zero and that the cores 43 and 45 each contain a stored one. In order to interrogate the core 43, a prime pulse is sent through the prime wire 23. This places the core 43 in the primed one state, but does not affect the cancelling cores since the prime wires do not pass through these cores. Readout is now achieved by pulsing the read wire 31 and noting the resultant sense amplifier output. The pulse provides a magnetizing force sufficient to saturate the associated saturable outer legs of the memory cores in the downward direction and to saturate the associated saturable outer legs of the cancelling cores in the upward direction. Since the core 43, which is being interrogated, was in the primed one state, the read pulse causes the flux direction to reverse in the center leg, leaving this core in the read one state and inducing a turnover voltage constituting a signal output in the sense winding. Since the read pulse cannot reverse the flux direction in the cancelling cores, these cores cannot produce a corresponding turnover voltage.

The remaining memory cores in the column traversed by the read pulse cannot produce a turnover voltage. The core 41 remains in the stored zero state and the core 45 remains in the stored one state. Since the flux in the outer leg adjacent to the read winding is downward in both of these states, the read pulse cannot reverse the direction of the flux in either instance.

This pulse, however, does produce a noise voltage in these cores since it produces a magnetizing force that drives the core from its remanent state to saturation. The read pulse also reinforces the flux in the cancelling cores and drives these cores from the remanent state to saturation.

The sense wire is threaded through each cancelling core in the same direction as it is threaded through the corresponding row of memory cores, but the direction of the flux change in the cancelling cores is opposite to that in the corresponding memory core, therefore the noise voltages induced in the sense wire by the cancelling cores neutralizes the noise voltage produced by the column of memory cores.

The read cycle is completed by passing a pulse through the clear wire. Any cores remaining in the primed one state are thereby converted to the cleared one state so that all cores are then in a state suitable for another read cycle. Since the clear wire does not link with any of the cancelling cores, these cores are unaffected by the clear pulse.

Since the polarity of the output signal from the memory unit is always the same, a sense amplifier responsive only to this polarity may be used with the circuit if desired. This permits a further refinement of the signal-to-noise ratio. The noise voltages occur during the rise and fall times of the read pulse. The turnover voltage lags the initial noise voltage, however, since the core material requires a finite time to switch from a remanent state to the opposite saturation state. If now, the noise cancelling voltage is made equal to or larger than the total memory noise voltage, the net noise voltage will be an inverted pulse. The amplifier will not respond to this initial inverted noise voltage, but will pass the correctly polarized turnover voltage. The read pulse can be maintained until after the turnover voltage pulse is complete so that any noise associated with the termination of the read pulse occurs after the normal readout time. Because the turnover voltage occurs free of any noise voltage, the time of readout and the amplitude of the turnover voltage becomes far less critical than in conventional circuits.

It will be appreciated that many variations of the circuit of FIG. 2 may be devised for practicing the invention. The linking of the sense wire with the cancelling cores may be reversed, for instance, by reversing the manner in which the read and set windings are linked with these cores. Any arrangement that produces a noise voltage that is out-of-phase with the noise voltage generated in the memory cores may be used for this purpose.

Similarly, other flux patterns than those illustrated may be used if desired. The geometry or composition of some cores, for instance, may be such that the noise voltage associated with a stored one is greater than the noise voltage associated with a stored zero. Since the cancelling voltage should be equal to or greater than the noise voltage of the memory core, the predetermined flux pattern of the cancelling cores could then be made equivalent to that of a stored one. The read wire could then be threaded through the cancelling core so as to reinforce this pattern during readout.

Figure 4:
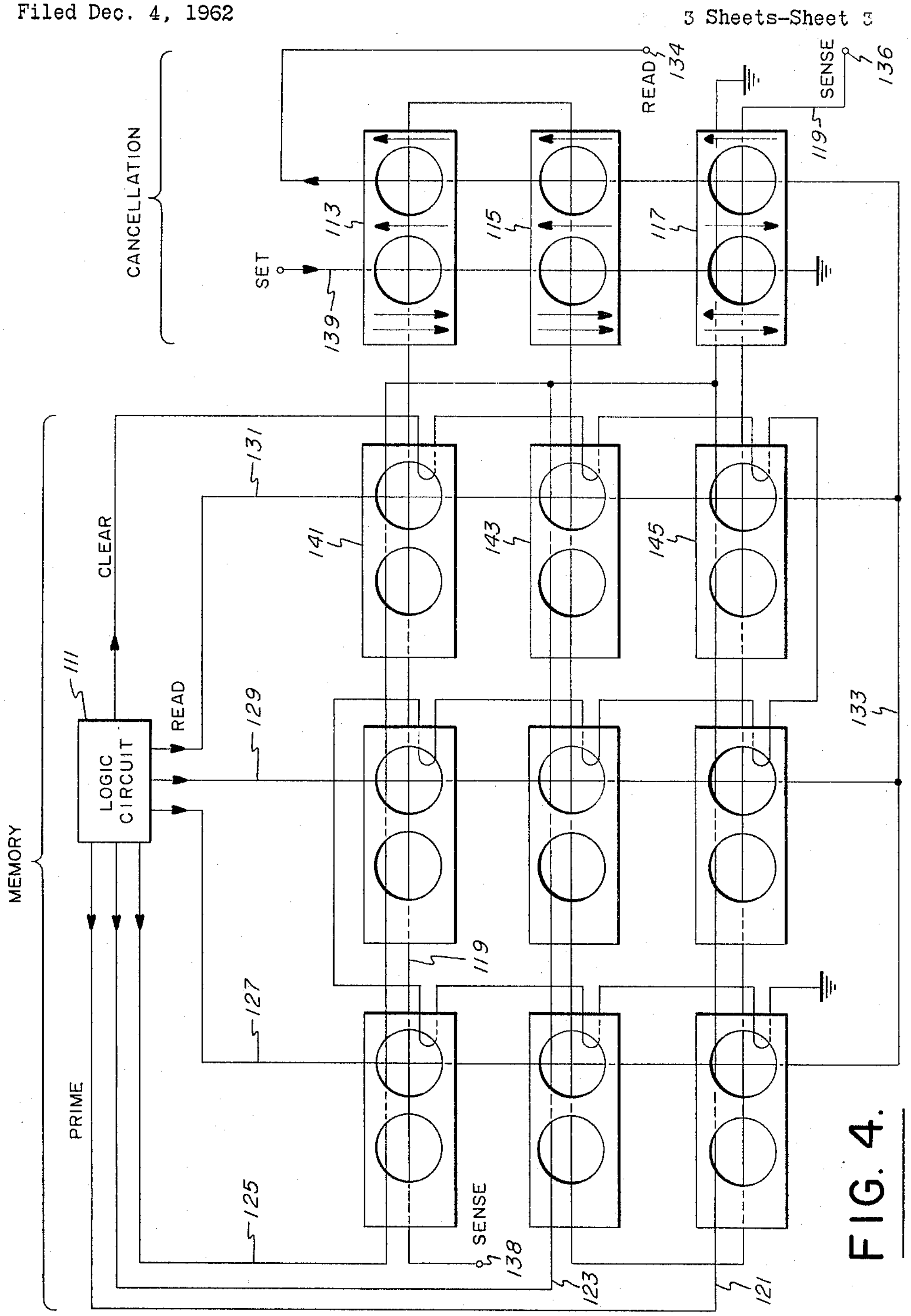
FIG. 4 is a schematic diagram illustrating a second embodiment of the invention.

A second embodiment of the invention is depicted in FIG. 4. Whereas the circuit of FIG. 2 provides sufficient compensation to cancel substantially all of the noise signal, the circuit of FIG. 4 provides additional compensation to cancel part of the signal output as well. This additional compensation provides further advantages that will become apparent as the description of this circuit proceeds.

The memory portion of this circuit is identical to that used in the previously described embodiment. A logic circuit 111 generates pulses suitable for operating the memory cores. The noise cancelling cores 113 and 115 are identical to the cores used in the memory circuit and are wired in the same fashion as the corresponding noise cancelling cores used in the embodiment of FIG. 2. The signal cancelling core 117, however, is designed to provide a turnover voltage that is equal to one half the turnover voltage of a memory core. Such a relationship can be provided by dimensioning the signal cancelling core 117 so that it supports an amount of flux equal to one half the amount that is supported by the memory core. This can be accomplished, for instance, by making the signal cancelling core 117 one half as thick as the memory cores.

The sense wire 119 is threaded through each core in the same fashion as the sense wire is threaded through the cores in FIG. 2.

The prime wires 121, 123, and 125 are threaded through the respective rows of the memory unit and joined in a common lead. Instead of being grounded directly, however, this common lead is first threaded through the signal cancelling core 117 in such a fashion that a prime signal passing through this lead establishes upwardly directed flux in the center leg of the core.

The read wires 127, 129, and 131 join in a common bus 133 which is threaded through each cancelling core so as to establish upwardly directed flux in the saturable outer legs of these cores. The bus 133 may be terminated or brought out to an output terminal 134.

A set wire 139 is threaded through the cancelling cores so as to provide upwardly directed flux in the center legs of the noise cancelling cores 113 and 115, but downwardly directed flux in the center leg of the signal cancelling core 117.

The circuit is prepared for operation by passing pulses through the set wire and the read wire associated with the cancelling cores. This establishes the flux patterns in these cores depicted in FIG. 4.

For the purposes of explanation, assume that the core 141 contains a stored zero and that the cores 143 and 145 each contain a stored one.

Figure 5:
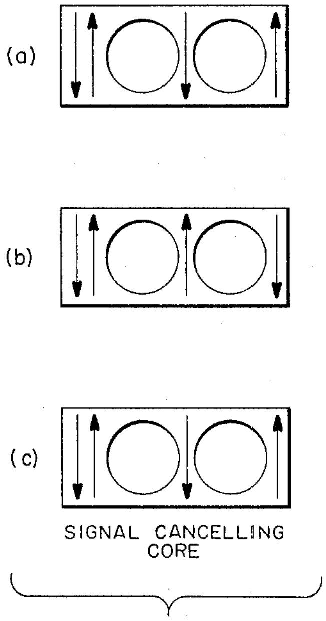
FIG. 5 is a schematic diagram useful in explaining the operation of the embodiment of FIG. 4.

In order to interrogate the core 143, a prime pulse is passed through the prime wire 123. This leaves the core 143 in the primed one state, but also reverses the flux pattern in the signal cancelling core 117 from the pattern of FIG. 5(*a*) to the pattern of FIG. 5(*b*). The flux in this core is now directed upwardly in the center leg and downwardly in the outer saturable leg. That is, the flux now flows around the right aperture in a clockwise direction, whereas the flux in the memory core 143, which is in the primed one state, flows around the right aperture of this core in a counterclockwise direction. Thus, the common bus 133, the set wire 139, and the common lead from the prime wires are used in combination as a means for establishing a predetermined flux pattern in the cancellation cores.

In order to complete the interrogation of the core 143, a read pulse is sent through the wire 131. This provides a readout of the information stored in the core 143, but also creates noise voltages due to reinforcement of the flux in the cores 141 and 145. These noise voltages, however, are cancelled by out-of-phase voltages contributed by the noise cancelling cores 113 and 115. The read pulse also reverses the flux in the interrogated core 143, leaving it in the read one state, and inducing a turnover or signal voltage in the sense wire. At the same time, the read pulse reverses the flow of flux around the right aperture of the signal cancelling core 117 returning it to the state shown in FIG. 5(*c*). The direction of the change in flux, however, is opposite to the change occurring in the interrogated memory core 143. Futhermore, the quantity of flux in the signal cancelling core 117 is one half the quantity in the memory core. Consequently, the change in flux in the signal cancelling core induces a voltage in the sense wire that is one half the magnitude and out-of-phase with the voltage induced in the same wire by the memory core. Assuming that the interrogated core 143 produces a positive-going voltage pulse, the signal cancelling core will produce a concurrent negative-going pulse, so that the net voltage output at the sense output terminal 136 is a positive-going pulse of one half the amplitude of the turnover voltage of the memory core. The sense wire thus provides a means for extracting a difference signal between the voltages contributed by the memory cores and the voltages contributed by the cancelling cores.

On the other hand, if the memory core 143 had originally contained a stored zero, the read pulse would have produced no turnover voltage in this core, so that the signal voltage appearing at the sense output terminal would be only the negative-going turnover voltage of the signal cancelling core. The amplitude of this voltage will also be equal to one-half the amplitude of the normal turnover voltage of a memory core.

Thus it is seen that the state of the interrogated core can be determined by noting the presence or absence of a sensing pulse of a given polarity with the embodiment of FIG. 2. The state of the interrogated core, with the embodiment of FIG. 4, however, can be determined by noting the polarity of the sensing pulse.

Since the embodiment of FIG. 4 normally produces an output signal for either state of the interrogated core, malfunctioning of this circuit can be readily detected.

If the circuit is operating properly, a read signal generated by the logic circuit will always produce an output signal at the sensing terminal 136 as well as a signal at the read terminal 134. A sense signal occurring during the read time without an accompanying read pulse is obviously spurious. Similarly, a read signal output unaccompanied by a sense signal output also indicates a malfunction.

Thus, by observing the read and sense pulses appearing at the terminals 134 and 136 respectively, proper functioning of the apparatus can be verified.

Straight forward logic circuits may be employed to detect such malfunctioning automatically if desired.

In some instances, it may be more convenient to have a memory system in which the output pulses are all of the same polarity but appear at one terminal or the other, depending upon the state of the interrogated core. This can be accomplished with the circuit of FIG. 4 by bringing the two ends of the sense wire out to separate terminals. Thus, for instance, if the interrogated core had been in the primed one state, a positive-going pulse might be detected at the terminal 136. However, if this core had been in the primed zero state, a positive-going sense pulse would appear at the opposite sense terminal 138.

The circuit used in this fashion still provides means for detecting malfunctions. Proper functioning is indicated when and only when a read pulse is accompanied by a sensing pulse of the chosen polarity at either one or the other of the sense terminals.

Again, malfunctioning of the circuit can be indicated automatically by using straight forward logic circuits to detect the proper concurrence of read and sense signals.

Although the signal cancelling core is preferably designed to provide a half-amplitude signal, it will be appreciated that signal cancelling cores providing voltages that are other fractional or multiple parts of the particular signal output voltage may be constructed if desired.

Since the cancelling cores in either embodiment will normally be in the same environment as the memory cores, the magnetic properties of all cores will be affected equally by ambient temperature changes. Thus the system can operate efficiently over a wide temperature range.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An improved magnetic core memory system comprising:

(a) an array of bi-aperture memory cores,
(b) means to read selected groups of memory cores,
(c) a group of bi-aperture cancelling cores,
(d) a common bus connected to receive read signals from the array of memory cores, said bus being threaded through each cancelling core,
(e) means to establish predetermined flux patterns in the cancelling cores previous to a reading, (f) a sense wire magnetically coupled to the center leg of each core in the system so that a flux change in any core resulting from a read signal induces a voltage in the sense wire,
(g) said sense wire being threaded through the various cores so that the voltages induced by the cancelling cores oppose the voltages induced by the memory cores.

2. A magnetic core memory system comprising an array of bi-aperture memory cores, means to prime a first selected group of said memory cores, means to read a second selected group of said memory cores, said second selected group having one core in common with said first selected group, a group of cancelling cores, means to read the group of cancelling cores concurrently with the second group of memory cores, means to extract the difference between the signal outputs of the second group of memory cores and the group of cancelling cores when the second group of memory cores is read.

3. A magnetic core memory system comprising:
(a) an array of bi-aperture memory cores disposed in rows or columns,
(b) a column of bi-aperture cancelling cores,
(c) individual read wires threaded through each column of memory cores,
(d) a common bus connected to receive current pulses from all of the read wires, said common bus being further threaded through each cancelling core,
(e) a sense wire threaded through each core in series, said sense wire being inductively coupled to a read wire through each memory core and to the common bus through each cancelling core, said sense wire being further threaded through the various cores so that a given change in current through the read wire induces a voltage of one polarity in the sense wire through the memory cores but of the opposite polarity through the cancelling cores.

4. A magnetic core memory system comprising:
(a) an array of bi-aperture magnetic memory cores disposed in rows and columns,
(b) a column of cancelling cores,
(c) a sense wire threaded through all of the memory and cancelling cores serially so as to intercept magnetic flux flowing in each core,
(d) individual read wires threaded through each column of the array of memory cores, and
(e) a bus connected to receive an electrical read current from any of the read wires,
(f) said read wires each being coupled with the memory cores in the associated column so as to cause a change of magnetic flux in the cores when a pulse of current flows in the read wire,
(g) said bus being coupled to each cancelling core so as to cause a change of magnetic flux in the cancelling cores when a pulse of current from a read wire passes through the bus,
(h) said sense wire being threaded through the various cores so that the flux changes in the memory cores caused by a given change in read current induce a voltage of one polarity in the sense wire whereas the flux changes in the cancelling cores caused by the same current induce a voltage of the opposite polarity in the sense wire.

5. An improved magnetic memory system comprising:
(a) an array of bi-aperture magnetic memory cores disposed in rows and columns,
(b) individual prime wires linking each row,
(c) individual read wires linking each column,
(d) an additional column of cancelling cores, the number of said cancelling cores being equal to the number of cores in a single column of memory cores,
(e) a common bus connected to receive read pulses from each read wire, said bus being linked with each cancelling core,
(f) a set wire linked with each cancelling core, and
(g) a sense wire linked with each core so that the voltages induced in this wire through the cancelling cores tend to oppose the voltages induced in this winding through the memory cores.

6. An improved magnetic core system comprising:
(a) an array of bi-aperture memory cores disposed in rows and columns,
(b) a column of bi-aperture cancelling cores, each cancelling core being substantially identical to a memory core,
(c) individual read wires threaded through each column of memory cores,
(d) a common bus threaded through each cancelling core and connected to receive a read pulse from any read wire, and
(e) a sense wire threaded serially through each core in the system,
(f) said read wires and said sense wires being magnetically coupled to the memory cores so that a pulse in the read wire can induce signal voltages and noise voltages in the sense wire,
(g) said common bus and said sense wire being magnetically coupled to each cancelling core so that a read pulse in said common bus induces a noise voltage in the sense wire,
(h) said sense wire being further coupled to the cancelling cores so that the noise voltages induced by the cancelling cores substantially cancels the noise voltages induced by the memory cores.

7. An improved magnetic core memory system comprising:
(a) an array of bi-aperture memory cores,
(b) a plurality of read wires each threaded through a selected group of the memory cores,
(c) a source of read pulses,
(d) a group of bi-aperture cancelling cores, each core in said group being substantially identical to the memory cores,
(e) a common bus connected to each read wire,
(f) means to establish predetermined patterns of remanent flux in each cancelling core previous to the occurrence of a read pulse,
(g) said common bus being threaded through each cancelling core so that a pulse from said source flowing through the bus drives each cancelling core to saturation with no reversal in the pattern of remanent flux, and
(h) a sense wire magnetically coupled to the center leg of each magnetic core in the system so that a flux change in any core resulting from a read pulse induces a voltage in the sense wire,
(i) said sense wire being threaded through the various cores so that voltages induced in this wire by memory cores in which the read pulse does not reverse the flux pattern is opposed by voltages induced in this winding by the cancelling cores.

8. A magnetic core memory system comprising:
(a) an array of bi-aperture memory cores arranged in rows and columns,
(b) center and outer saturable legs in each memory core,
(c) a column of bi-aperture cancelling cores, each cancelling core being substantially identical to each memory core,
(d) a source of read pulses,
(e) individual read wires threaded through each column of memory cores and connected to receive read pulses from said source, said read wires being coupled to each core in the respective column so as to produce downwardly directed flux in the outer saturable core legs when the wire is traversed by a read pulse,
(f) a common bus connected to receive read pulses from any read wire, said common bus being further coupled to each cancelling core so as to produce upwardly directed flux in the outer saturable legs of these cores when the bus is traversed by a read pulse, (g) a set wire threaded through each cancelling core so as to prdouce upwardly directed flux in the center legs of these cores when the wire is traversed by a suitable pulse, (h) individual prime wires threaded through each row of memory cores so as to produce downwardly directed flux in the center legs of the associated cores when the wire is traversed by a suitable pulse, and (i) a sense wire threaded serially through each core in the system, said sense wire being magnetically coupled to the center leg of each core so that a given flux change in any center leg induces a voltage of the same polarity in the sense wire.

9. A magnetic core memory system comprising an array of memory cases, a group of cancelling cores, readout means to determine the state of the remanent flux in any specified memory core, noise cancelling means to overcome the noise voltage produced in the memory cores during readout, signal cancelling means to produce a half-amplitude signal voltage during readout, and sensing means to provide a signal equal to the algebraic difference between the output from the specified memory core and the output from the signal cancelling means.

10. A magnetic core memory system comprising:

(a) an array of bi-aperture memory cores disposed in rows and columns, (b) individual prime wires linking each row, (c) individual read wires linking each column, (d) an additional column of bi-aperture cancelling cores, (e) said column of cancelling cores including a signal cancelling core dimensioned to saturate with substantially one-half the flux required for saturation in any other core in the system, (f) a saturated center leg in each bi-aperture core, (g) means to prime said signal cancelling core when any row of memory cores is primed, (h) a common bus connected to receive read signals from said read wires, said common bus being threaded serially through each cancelling core, (i) said common bus being magnetically coupled to the signal cancelling core in a direction to reverse the primed flux pattern in this core when the bus is traversed by a read signal, said bus being further magnetically coupled to all other cancelling cores in a direction to saturate these cores without reversing the flux pattern when the bus is traversed by a read pulse, and (j) a sense wire magnetically coupled to the center leg of each core so that a given flux change in the center leg of any core induces a voltage of the same polarity in the sense wire.

11. A magnetic core memory system comprising:

(a) an array of bi-aperture memory cores disposed in rows and columns, (b) individual prime wires threaded through reach row of memory cores, (c) individual read wires threaded through each column of memory cores, (d) an additional column of bi-aperture cancelling cores, (e) center and outer saturable legs in each core in the system, (f) said column of cancelling cores including a signal cancelling core, (g) said signal cancelling core having a thickness one-half the thickness of the other cores in the system, (h) a common lead connected to receive prime signals from any of said prime wires, said common lead being threaded through the signal cancelling core so as to prime this core whenever a prime pulse traverses the common lead, (i) a common bus connected to receive read signals from any of said read wires, said common bus being threaded through each cancelling core, (j) said common bus being matnetically coupled to the signal cancelling core in such relationship that a read signal can reverse the primed flux pattern in this core, said bus being magnetically coupled to all other cancelling cores in such relationship that a read signal reinforces the normal flux pattern in these cores, and (k) a sense wire magnetically coupled to each core in the system so that a change in flux in any core accompnaying a read pulse can induce read voltages in the sense wire, (l) said sense wire being serially threaded through each core so that the read voltages induced by the cancelling cores oppose the read voltages induced by the memory cores.

No references cited.

BERNARD KONICK, *Primary Examiner.*

J. MOFFITT, *Assistant Examiner.*